Sept. 20, 1938.  F. SMITH  2,130,568

PARACHUTE APPARATUS

Original Filed March 6, 1935

INVENTOR.

Floyd Smith

BY *Lancaster, Allwine and Rommel*

ATTORNEYS.

Patented Sept. 20, 1938

2,130,568

UNITED STATES PATENT OFFICE 2,130,568

PARACHUTE APPARATUS

Floyd Smith, Buffalo, N. Y., assignor to Irving Air Chute Company, Inc., Buffalo, N. Y., a corporation Original application March 6, 1935, Serial No. 9,670. Divided and this application March 25, 1937, Serial No. 133,054

9 Claims. (Cl. 244—151)

This invention relates to improvements in parachute apparatus.

The primary object of this invention is the provision of an improved harness. It constitutes a division from my co-pending application Serial Number 9,670, filed March 6, 1935.

A further object of this invention is the provision of an improved quick connector pack and harness for aviators embodying means for the emergency attachment of the pack at the front of the wearer under such circumstances that the container remains at such location upon opening of the pack.

A further object of this invention is the provision of an improved emergency attachable parachute pack and harness in which the pack may be so connected to the harness that the harness release coupling parts may be readily released when landing in order to permit the rider to slide out and free himself with facility from the parachute and harness when landing in water or high wind.

A further object of this invention is the provision of emergency attachable pack parachute apparatus, such as shown in the U. S. Hamer Patent #1,958,000, but embodying an improvement thereover in the elimination of movement of the container past the face of the wearer upon release of the parachute canopy.

Other objects of the invention embody, in parachute apparatus of the above nature, provision for the ready handling and guiding of the parachute during a descent; the safe operation of the parachute in event only one coupling part of the pack is attached to one coupling of the harness and the elimination of the danger of metal parts of the pack or harness hitting or contacting the head of the wearer during a parachute descent.

Other objects and advantages of the invention will be apparent during the course of the following detailed description.

In the accompanying drawing, forming a part of this specification, and wherein similar reference characters designate corresponding parts throughout the several views, Figure 1 is a front view of an individual wearing the improved pack and harness.

Figure 4:
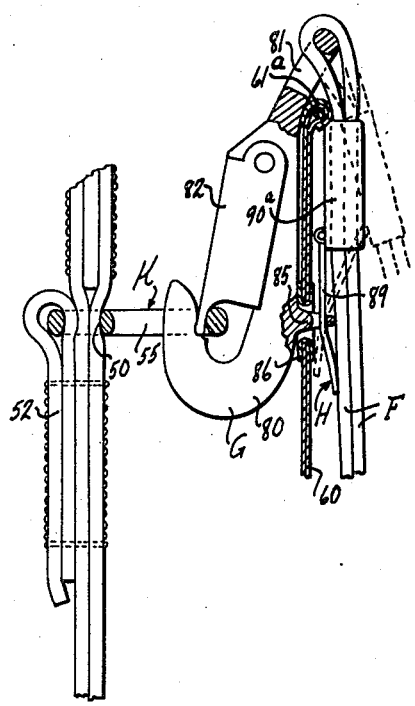
Figure 3:
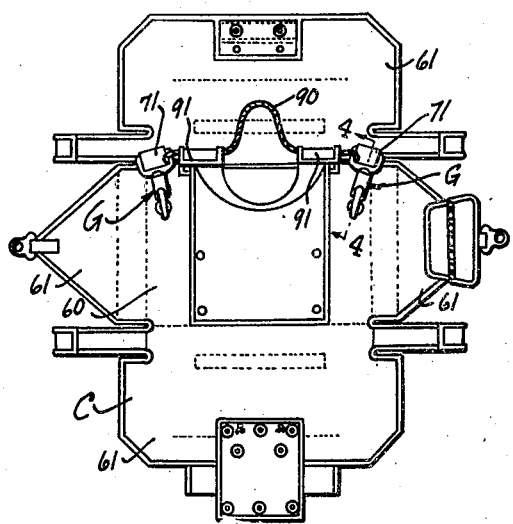
Figure 3 is a rear view of the open container showing the relation of the pack coupling parts in their releasably fastened relation upon the container.

Figure 4 is an enlarged fragmentary sectional view taken substantially on the line 4—4 of Figure 3, and showing more particularly the improved means for releasably retaining a riser web coupling upon the container in a fixed relation so that the said coupling part of the pack may properly cooperate in attachment with a coupling part of the harness, for emergency purposes, as has been more particularly set forth in U. S. Patent #1,958,000. This view also shows the associated connection of the harness and pack coupling parts.

In the drawing, wherein for the purpose of illustration is shown only a preferred embodiment of the invention, the letter A may generally designate the improved harness, with which the improved pack may be detachably associated. The pack is of the general nature set forth in U. S. Patent #1,554,192, and may include a container C of somewhat conventional construction for releasably housing a parachute canopy. Conventional shroud lines are associated with the canopy, terminating in any desired number of supporting or suspension webs F. These suspension webs F at each side of the pack terminate in coupling parts G releasably associated by means H in fixed relation upon the outer side of the container for mutual releasable attachment with complementary coupling parts K associated with the harness A in a relation to be subsequently described.

Figure 1:
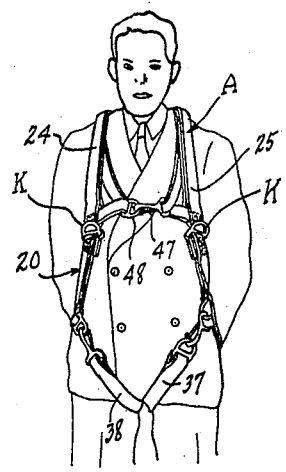
Figure 2:
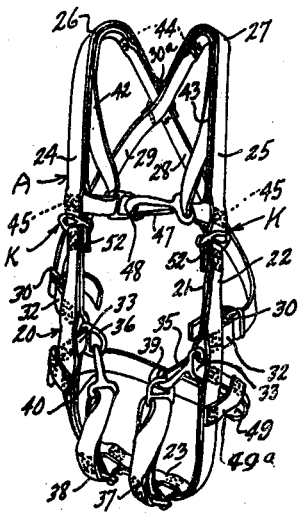
Figure 2 is a perspective view of the harness with the fittings thereof coupled together.

The improved parachute harness A may be constructed of any desired webbing. It generally partakes of the characteristic of the Ball harness set forth in U. S. Patent #1,560,366, although it may be of the single-point release type such as shown in U. S. Patents #1,899,656 or #1,842,611. In the main it comprises a body supporting sling 20 consisting of a double thickness of webbing 21 and 22 stitched together to provide a seat portion 23 upon which the wearer sits during a parachute descent. Side riser portions 24 and 25 complete the major part of the sling. In the present harness, since the suspension webs are not directly connected as a part of the harness, the riser webs 24 and 25 continue to provide shoulder straps 26 and 27 respectively which cross over at the back of the wearer respectively providing back straps 28 and 29 which are slidably associated in loosely connected relation at 30ª, as is conventional practice with the back straps of some modern types of harnesses. These back straps 28 and 29 continue downwardly across the back around the sides of the wearer adjacent to the waist, where they are adjustably connected with suitable coupling fittings 30, more particularly shown in Figure 2 of the drawings. Each riser web 24 and 25, above the seat strap 23, is provided with a doubled strap sewn between the portions comprising the respective riser strap or web to provide a rearwardly facing loop 32 permanently supporting the adjusting buckles or fittings 30 to which the back strap is adjustably connected; the latter being forced through the openings of the buckles in order to hold the adjustment. These straps sewn between the layers of the riser webs 24 and 25 each provide a loop 33. These loops 33 at the front edge of the riser straps serve to permanently support leg strap couplings 35 and 36.

The seat strap 23 of the harness is provided with usual adjustable leg straps 37 and 38 having coupling fittings 39 and 40 at the free ends thereof for respective complementary association with the couplings 35 and 36, in order to provide leg openings with the sling, in accordance with the teaching of the Ball Patent #1,560,366.

Suitable means is provided to releasably retain the upper part of the harness upon the body of the wearer, comprising auxiliary breast and shoulder straps 42 and 43 respectively stitched at 44 to the shoulder back straps 26—28 and 27—29, and continuing over the shoulders and the front of the harness where they are respectively stitched at 45 to the riser webs 24 and 25 of the sling of the harness. These loops, in the nature of breast straps, have complementary coupling parts 47 and 48 thereon for releasable connection across the breast of the wearer.

It is a notable feature of the harness, as thus described, that there are no suspension lines permanently connected to the harness. The harness in the form above described is adapted to encase and fit about the body of the wearer in a comfortable and adjustably-safe relation.

The straps which form the loops 33 are continued rearwardly of the harness, above the seat 23, to provide a crossing back strap 49, which prevents the wearer from falling rearwardly down through the harness during a parachute descent. This back strap 49 is positioned appreciably lower than the ordinary parachute harness back strap, so that it extends across the hips of the wearer, appreciably below the peaks of the hips, and horizontally below the small of the back of the wearer. In harnesses heretofore the back straps have been positioned at or above the small of the back of the wearer. With the hip strap 49 here provided injury to the wearer at the time of a shock opening is entirely eliminated with less liability of the wearer falling rearwardly through the harness. In order to hold the position of the hip strap so that it will not slide upwardly on the back of the wearer diagonal retaining straps 49ª extend from the horizontal hip strap 49 for connection with the seat strap at a location below the points where the hip strap 49 is stitched to the riser webs of the supporting sling, as will be seen from Figure 2.

An improved feature of the harness is the provision of the fixed coupling part K upon the riser webs 24 and 25 at or above the waist of the wearer, adjacent to but preferably above the center of gravity of the wearer, or in any desired position along the riser webs. These couplings K are preferably metal fittings. They provide a loop opening 50, shown in Figure 4, through which the double layered web of the risers 24 and 25 are disposed. An additional reinforcing loop 52 is permanently secured, as by stitching 53, to the rear of each riser web, and also looped through the opening 50. The portions of the riser webs and reinforcing loops 52 threaded thru each of the openings 50, are squeezed and compressed tightly in the openings 50 to rigidly and fixedly position the coupling parts K on the riser webs with its front coupling loop portion 55 in outstanding relation normal to the respective riser 24 or 25. These coupling eyes or loops are thus permanently and fixedly connected to the harness in an outstanding definitely spaced relation for cooperative complementary connection with the pack.

If desired the usual back pad may be used with the back straps.

Referring to the pack, the container C thereof includes the usual back or body wall 60, which may be appropriately reinforced in a semi-rigid relation by means of a wire frame 61ª, in accordance with the teachings of the prior art. The back wall 60 may be provided with the usual closure flaps 61, or the container may have a separate closure as part thereof. The shape and arrangement of the container is unimportant except insofar as the retention of the coupling parts thereon is concerned. The container may include the usual pockets for receiving the shroud lines as set forth in U. S. Patent #1,554,192. The flaps of the container are brought together over the packed parachute canopy and shroud lines and releasably held together by means of the conventional rip cord arrangement such as set forth in U. S. Patent #1,462,456.

The shroud lines are bunched together and connected to two suspension webs, which are adapted to be disposed at each side of the wearer during a parachute descent. Thus, each pair of suspension webs F is provided with a coupling member G complementary to the coupling member K. This coupling member G is in the nature of a snap fastener, including a hook portion 80 having an apertured eye 81 at the end thereof, thru which the pair of suspension webs F are connected. The snap fastener may include the usual detent 82 of well known construction.

The suspension webs are disposed inside of the container in such relation that only the coupling parts G extend exteriorly at opposite top corners of the pack and there they are held by the improved means H, in a fixed readily attachable relation with respect to the complementary coupling parts K of the harness. The means H includes an apertured stud 85 on the back of the hook portion 80 of each of the coupling parts G adapted to extend through a grommet or washer 86, disposed upon the back wall 60 of the pack and opening into the container. Each pair of suspension webs F adjacent to their connection with the respective coupling part G, is provided with a wire pin or retaining member 89 affixed as at 90ª to the suspension webs. It may be flexible or semi-flexible and it is adapted to extend through the eye of the stud 85 in order to releasably lock the coupling part G on the outer side of the wall 60 at the corner of the pack, as shown in Figures 3 and 4 of the drawing in position for complementary attachment to the coupling part K. It is noted that the length of the suspension webs between the rip pin 89 and the eye 81, to which the webs are attached, is such that the coupling part G is applied rather tightly against the wire frame 61 and held against swivelling or turning until the pin 89 is released from the stud 85.

As will be noted from Figure 3 the coupling parts G are thus held in definitely spaced and faced relation complementary to the spacing and facing of the coupling parts K of the harness A. This spacing of the coupling parts G with respect to the spacing of the coupling parts K is identical when the harness is upon the wearer, so that the pack B may be taken by the wearer and merely a push of the detents 82 of the couplings G against the coupling parts K is necessary in order to couple the complementary parts G and K, as is quite apparent.

As a safeguard to insure a distribution of the load upon all of the suspension webs and shroud lines in event it is possible during an emergency attachment of the pack upon the harness to only couple one of the parts G with one of the parts K, I provide a wire cable connection 90, shown in various views of the drawing, particularly in Figure 3, having the ends thereof securely affixed in the eye portions 81 of the two coupling parts G. This wire cable connection may also furnish the means of attaching the container C thereto, by means of fabric loops 91, as shown in Figure 3 of the drawing. The cable 90 is rather loose as positioned upon the container when the coupling parts G are affixed therewith, as shown in Figure 3, and this enables the container to hang loosely on the cable 90 during a parachute descent, so that the container may be slid to one side in order not to interfere with release actuation of parts of the harness or to interfere with the vision of the parachutist.

The parachute canopy emerges from the pack in normal manner and when fully deployed the rip pins 89 are pulled from the studs 85 and this of course releases the connecting couplings G from the container. Due to the fact that the container C remains at the front of the wearer connected only to the spreader or connecting wire cable 90 the riser webs F are spread in divergent relation up above the head of the wearer so as to facilitate release of the harness coupling parts when approaching a landing in order that the rider may readily release himself or herself from the harness, as is sometimes necessary when landing in water or in a high wind. With this arrangement the wearer may guide the parachute and handle it with facility during a parachute descent, through the suspension webs F.

The improved harness of the present invention may be used with either a back pack or a seat pack. Thus it is possible to use it with the back pack shown in the Smith Patent #1,462,456.

Various changes in the shape, size, and arrangement of parts may be made to the form of invention herein shown and described, without departing from the spirit of the invention or the scope of the claims.

I claim:

1. In parachute apparatus the combination of a parachute harness for detachable attachment with an emergency detachable pack comprising body encasing straps, a coupling ring, and means permanently fixing said ring in outstanding position directly upon the harness straps at the front of the wearer definitely faced in non-wobbling position at all times with respect to the particular harness strap portion to which it is connected.

2. In parachute harness the combination of a U-shaped supporting sling including side riser straps and other body engaging straps, coupling parts on each of the side riser straps at the front of the wearer, and means permanently fixing said coupling parts in non-wobbling connection therewith below the normal shoulder line in such manner as to be definitely faced at all times in the same position with respect to the portions of the risers to which respectively connected, for detachable connection with complementary coupling parts of an emergency pack.

3. In parachute harness the combination of a U-shaped supporting sling including side riser straps and other body engaging straps, rigid coupling rings on each of the side riser straps at the front of the wearer, and means permanently fixing said coupling ring in connection therewith in outstanding non-wobbling relation to the respective riser straps at all times so that their openings face upwardly and downwardly for detachable connection with complementary coupling parts of an emergency pack.

4. In a parachute harness, the combination of body attaching straps including side riser portions extending at the front of the wearer along the upper part of the body of the wearer, coupling rings of rigid material, and means permanently affixing a coupling ring to each of the side riser portions in rigid position at the front of the wearer so that the planes of the rings lie normal to the portions of the respective risers to which they are attached, with the ring opening facing downwardly and upwardly when the harness is upon a wearer.

5. A parachute harness comprising a U-shaped supporting sling having a sling seat and upstanding riser portions crossed at the back and thence extending downwardly for connection with the riser portions at a location above the sling seat, leg strap means connected with the sling seat, cross connecting breast strap means connecting the riser portions of the U-shaped sling, and a U-shaped reinforced supporting web connected with and extending along the sling and riser portions and over the shoulders of the wearer and having slip loop connections for the portions which cross at the back as above mentioned.

6. A parachute harness constructed from webbing including a sling seat provided with side riser portions, a reinforcing web conforming to the sling seat, and compound suspension means connected with the reinforcing web and side riser portions adjacent to and above the center of gravity of a wearer and in such connection with the side riser portions of the webbing that the said suspension means will remain at said location during a parachute drop.

7. Parachute harness comprising webbing having a sling-like seat and side riser portions, suspension couplings connected to each of said side riser portions for releasable connection with parts of a parachute pack or canopy, said suspension members being located on the side riser portions adjacent to but above the center of gravity of a wearer's body in the vicinity of the breast of the wearer, and means connecting said couplings to the side riser portions in definite non-wobbling position thereon against removal from such position prior to or during a parachute drop.

8. In a parachute harness, the combination of body attaching straps having means thereon to encase the same upon a wearer, a coupling ring of rigid metal, and means permanently affixing said coupling ring to the front of a harness strap in rigid position below the normal shoulder line of the harness so that the plane of said ring lies normal to the strap portion upon which it is attached with the ring opening facing downwardly and upwardly when the harness is upon a wearer and forming a fixed load suspension point upon the harness for attachment with a parachute.

9. In a parachute harness the combination of body attaching straps including side riser portions extending at the front of the wearer along the upper part of the body of the wearer, coupling rings of rigid material, and means permanently affixing a coupling ring to each of said side riser portions in rigid non-wobbling position at the front of the wearer between the waist and shoulder lines so that the planes of the ring lie transverse to the line of the respective riser portions on which they are positioned with the ring opening facing upwardly and downwardly when the harness is upon a wearer to facilitate attachment of complementary coupling parts of a pack thereto.

FLOYD SMITH.